(12) United States Patent
Monovoukas et al.

(10) Patent No.: US 6,758,996 B2
(45) Date of Patent: Jul. 6, 2004

(54) CELLULOSE-REINFORCED THERMOPLASTIC COMPOSITE AND METHODS OF MAKING SAME

(75) Inventors: Yiannis A. Monovoukas, Waltham, MA (US); Steven J. Anderson, Green Bay, WI (US); David Leeman, Worcester, MA (US); Anatole A. Klyosov, Newton, MA (US); George P. Philippidis, Chestnut Hill, MA (US)

(73) Assignee: Kadant Composites Inc., Bedford, MA (US)

( * ) Notice: Subject to any disclaimer, the term of this patent is extended or adjusted under 35 U.S.C. 154(b) by 384 days.

(21) Appl. No.: 09/905,431

(22) Filed: Jul. 13, 2001

(65) Prior Publication Data

US 2003/0030176 A1 Feb. 13, 2003

(51) Int. Cl.$^7$ ......................... B29C 43/00; B29C 45/00; B29C 47/00; D21H 17/01; D21H 17/33
(52) U.S. Cl. ............................. 264/176.1; 264/328.17; 264/331.11; 428/311.11; 428/326; 162/218; 162/293; 162/DIG. 9
(58) Field of Search .................... 264/176.1, 328.17, 264/331.11; 428/311.11, 326; 162/218, 293, DIG. 9

(56) References Cited

U.S. PATENT DOCUMENTS

| | | | |
|---|---|---|---|
| 3,367,917 A | 2/1968 | Granito et al. ............. 260/67.6 |
| 3,407,154 A | 10/1968 | Casebolt et al. ........... 260/17.3 |
| 3,407,155 A | 10/1968 | Casebolt et al. ........... 260/17.3 |
| 3,546,158 A | 12/1970 | Champion, Jr. et al. ...... 260/41 |
| 3,720,641 A | 3/1973 | Berardinelli et al. ......... 260/37 |
| 3,856,724 A | 12/1974 | O'Connor et al. ... 260/17.4 CL |
| 3,875,088 A | 4/1975 | Arons et al. ............ 260/2.5 H |
| 3,878,143 A | 4/1975 | Baumann et al. ...... 260/17.4 R |
| 3,943,079 A | 3/1976 | Hamed ................ 260/17.4 BB |
| 4,165,302 A | 8/1979 | Armenti et al. ................ 260/8 |
| 4,250,064 A | 2/1981 | Chandler .................. 260/17.4 |
| 4,282,119 A | 8/1981 | Tinkelenberg et al. ......... 260/6 |
| 4,339,363 A | 7/1982 | Nakagima .................... 524/34 |
| 4,343,727 A | 8/1982 | Cohen ........................ 524/41 |
| 4,362,827 A | 12/1982 | Tinkelenberg et al. ......... 524/9 |
| 4,376,144 A | 3/1983 | Goettler ..................... 428/36 |
| 4,414,267 A | 11/1983 | Coran et al. ................ 428/288 |
| 4,559,376 A | 12/1985 | Kubát et al. ................. 524/13 |
| 4,687,793 A | 8/1987 | Motegi et al. ............... 523/200 |
| 4,717,743 A | 1/1988 | Wakabayashi et al. ........ 524/13 |
| 4,737,532 A | 4/1988 | Fujita et al. .................. 524/13 |
| 4,783,493 A | 11/1988 | Motegi et al. ................ 524/13 |
| 4,791,020 A | 12/1988 | Kokta ....................... 428/326 |
| 4,820,749 A | 4/1989 | Beshay ...................... 523/203 |
| 4,822,826 A | 4/1989 | Pommier et al. .......... 521/84.1 |
| 4,851,458 A | 7/1989 | Hopperdietzel ............. 523/205 |
| 5,008,310 A | 4/1991 | Beshay ........................ 524/13 |
| 5,082,605 A | 1/1992 | Brooks et al. ............. 264/40.6 |
| 5,088,910 A | 2/1992 | Goforth et al. ............. 425/142 |
| 5,096,046 A | 3/1992 | Goforth et al. ............. 198/604 |
| 5,116,889 A | 5/1992 | Gilbert et al. ................ 524/14 |
| 5,120,776 A | 6/1992 | Raj et al. ..................... 524/13 |
| 5,153,241 A | 10/1992 | Beshay ......................... 524/8 |
| 5,288,772 A | 2/1994 | Hon ............................ 524/35 |
| 5,288,775 A | 2/1994 | Bischoff et al. ............... 524/2 |
| 5,306,550 A | 4/1994 | Nishiyama et al. .......... 428/288 |
| 5,474,722 A | 12/1995 | Woodhams ................ 264/45.3 |
| 5,480,602 A | 1/1996 | Nagaich ..................... 264/122 |
| 5,486,553 A | 1/1996 | Deaner et al. ................ 524/13 |
| 5,516,472 A | 5/1996 | Laver ......................... 264/118 |
| 5,539,027 A | 7/1996 | Deaner et al. ................ 524/13 |
| 5,585,155 A | 12/1996 | Heikkila et al. ............ 428/36.7 |
| 5,635,125 A | 6/1997 | Ternes et al. ........... 264/328.18 |
| 5,738,935 A | 4/1998 | Turk et al. ............... 428/304.4 |
| 5,746,958 A | 5/1998 | Gustafsson et al. ......... 264/115 |
| 5,767,177 A | 6/1998 | Omente et al. ............. 523/447 |
| 5,767,178 A | 6/1998 | Kolker et al. ................ 524/13 |
| 5,783,125 A | 7/1998 | Bastone et al. ............ 264/45.3 |
| 5,783,505 A | 7/1998 | Duckett et al. ............. 442/411 |
| 5,827,462 A | 10/1998 | Brandt et al. .............. 264/179 |
| 5,827,607 A | 10/1998 | Deaner et al. .............. 428/326 |
| 5,827,905 A | 10/1998 | Grigat et al. ............... 523/124 |
| 5,851,469 A | 12/1998 | Muller et al. ............. 264/177.1 |
| 5,863,480 A | 1/1999 | Suwanda .................. 264/209.8 |
| 5,866,264 A | 2/1999 | Zehner et al. .............. 428/481 |
| 5,938,994 A | 8/1999 | English et al. ............. 264/102 |
| 5,948,524 A | 9/1999 | Seethamraju et al. ....... 428/326 |
| 5,952,105 A | 9/1999 | Medoff et al. ........... 428/411.1 |
| 5,973,035 A | 10/1999 | Medoff et al. ................ 524/13 |
| 5,981,631 A | 11/1999 | Ronden et al. ............... 524/13 |
| 5,992,116 A | 11/1999 | Ternes et al. ................ 52/518 |
| 6,011,091 A | 1/2000 | Zehner ......................... 524/13 |
| 6,015,611 A | 1/2000 | Deaner et al. .............. 428/326 |
| 6,015,612 A | 1/2000 | Deaner et al. .............. 428/326 |
| 6,117,924 A | 9/2000 | Brandt ........................ 524/13 |
| 6,153,293 A | 11/2000 | Dahl et al. ................ 428/310.5 |
| 6,207,729 B1 | 3/2001 | Medoff et al. .............. 523/129 |
| 6,210,792 B1 | 4/2001 | Seethamraju et al. ....... 428/326 |

FOREIGN PATENT DOCUMENTS

| CA | 2100320 | 3/1994 |
|---|---|---|
| CA | 2178036 | 12/1996 |
| CA | 2242326 | 7/1997 |
| CA | 2250161 | 8/1997 |
| CA | 2278688 | 6/1999 |

Primary Examiner—Michael Colaianni
Assistant Examiner—Monica Fontaine
(74) Attorney, Agent, or Firm—Testa Hurwitz & Thibeault, LLP

(57) ABSTRACT

Granulated papermaking sludge is combined with plastic to form composite materials that may be shaped into structural and non-structural articles.

20 Claims, No Drawings

US 6,758,996 B2

CELLULOSE-REINFORCED THERMOPLASTIC COMPOSITE AND METHODS OF MAKING SAME

FIELD OF THE INVENTION

The present invention relates to a composite formulation useful as a feedstock in the manufacture of composite end products, such as structural and non-structural construction materials, roofing tiles, fences, door panels, sound barriers, decking materials, decorative wall coverings and the like, and methods of formulating the composite.

BACKGROUND OF THE INVENTION

Composite materials based on thermoplastic polymers and wood fiber-typically in the form of milled wood products or sawdust-mixed (compounded) with each other and with additives (lubricants, adhesives, compatibilizers, etc.), and manufactured using a high volume process such as extrusion or injection molding, have been known for many years. These materials, extruded or molded into suitable profiles, can replace wood in some applications, and offer the advantages of high resistance to moisture, insects and rot, good appearance, and the absence of knots and splinters.

The prior art includes thermosetting molding compounds containing cellulose fiber as filler. For example, U.S. Pat. No. 3,367,917 describes a thermosetting melamine-formaldehyde-benzoguanamine resinous molding composition containing a fibrous filler, such as alpha-cellulose pulp, in an amount between about 25% and 42% by weight. U.S. Pat. Nos. 3,407,154 and 3,407,155 describe thermosetting urea-formaldehyde and aminoplast resinous molding composition comprising fusible reactive urea-formaldehyde and aminotriazine-formaldehyde resin, respectively, and purified alpha-cellulose fibers (14%–25% by weight) as a filler. More recent innovations in this area are described in U.S. Pat. Nos. 4,282,119 and 4,362,827. In accordance with these patents, particle boards were produced employing a binding agent which was a combination of a polyisocyanate with a aminoplast resin containing 0.25 to 0.65 mole of formaldehyde per mole equivalent of amino groups. U.S. Pat. No. 3,546,158 describes a flooring composition involving a terpolymer, a non-fibrous filler (calcium carbonate, silica, clay, kaolin, carbon black, and the like) and a fibrous filler, such as wood flour, cellulose fibers, asbestos, and the like. Compositions may include 25% to 53% by weight of non-fibrous filler and 17% to 40% by weight of fibrous filler, with the fillers accounting for 50% to 80% of the total composite weight. U.S. Pat. No. 3,720,641 describes a process of blending an aromatic polyamide molding resin with reinforcing fillers, such as glass fibers, asbestos, cellulose fibers, cotton fabric paper and the like with the fillers ranging from 2% to 70% by weight based on the total molding composition. U.S. Pat. No. 5,288,775 describes moldable thermoset acrylic polymer composites containing 3% to 15% of cellulose fibers, fillers and water; the composite is a hard, high molecular cross-linking type that requires a chemical hardener. U.S. Pat. No. 5,767,177 describes a thermosetting composition comprising 33% to 43% of a thermosetting polyester resin, 5% to 15% of cellulose fiber of wood or cotton origin, 15% to 21% of mineral fillers (calcium carbonate or hydrated alumina) and 12.5% to 22.5% of reinforcement fibers such as glass, carbon, or Kevlar. U.S. Pat. No. 5,767,178 describes a thermoset (or a cold-set) composition of a phenol-aldehyde, a urea-aldehyde or a polyurethane, mixed with cellulose fibers and latex, containing magnesium oxychloride or magnesium oxysulphate to improve fire resistance of the resulting composite. A thermosetting composition, comprising both polyvinylchlorides and polyester resins along with sawdust and mineral fillers, is also described in U.S. Pat. No. 5,783,125.

Cellulose fiber has also been used as a reinforcing ingredient in thermoplastic compositions. U.S. Pat. No. 3,856,724 describes a composite based on polypropylene or low-density polyethylene (density 0.92) and 5% to 45%, preferably 20%, by weight of alpha-cellulose (100-mesh flock) along with some additives. U.S. Pat. No. 3,875,088 describes a composite material comprising 50% to 75% of a thermoplastic resin binder (ABS or rubber-modified polystyrene) and 20%–40% of wood flour (40-mesh and 100-mesh), with the ratio of plastic to wood flour being between 1.5 and 3.0. U.S. Pat. No. 3,878,143 describes a composite material comprising 63% by weight of polyvinyl chloride or polystyrene or ABS, and 30% of wood flour along with some minor additives. U.S. Pat. No. 3,943,079 describes a composite material comprising thermoplastic polyvinyl chloride polymer and cellulose fiber as major components, the cellulose fiber being wood pulp or cotton linters in amounts ranging from 16% to 30% by weight of the total. U.S. Pat. No. 4,165,302 describes filled thermoplastic resin compositions comprising low-density polyethylene, polypropylene and other resins (in amounts ranging from 95% to 50% by weight), organic fillers (such as wood flour) and inorganic fillers (such as fly ash or calcium carbonate). The '302 patent is concerned primarily with increasing the melt flow index of filled thermoplastic resin compositions rather than their mechanical properties.

It became recognized that fillers, particularly cellulose fibers, do not disperse easily throughout the plastic formulations during mixing and molding. Accordingly, the finished products typically do not exhibit the desirable physical characteristics ordinarily associated with fiber-reinforced plastic composites. This problem has been dealt with in a number of patents. For example, U.S. Pat. No. 4,250,064 describes usage, along with low-density organic fibers (such as polyester fiber or cellulosic fiber), of a combination of coarse and fine inorganic filler such as calcium carbonate (20% to 50% by weight), which makes the organic filler more easily and uniformly dispersed in a plastic matrix (preferably chlorinated polyethylene or a vinyl chloride/vinyl acetate copolymer), avoiding visible clumps of fiber. U.S. Pat. No. 4,339,363 describes a thermoplastic resin composition involving crushed wastepaper (40% to 60% by weight), polyethylene, polypropylene or other thermoplastic resin and their combinations, and optionally an inorganic filler, such as calcium carbonate, talc, barium sulfate or the like (8% to 12% by weight). The '363 patent indicates that such compositions provide higher heat resistance, flame retardancy and mechanical strength compared with those made of synthetic resins, pure or blended with woodmeal or having incorporated inorganic filler. U.S. Pat. No. 4,343,727 describes a thermoplastic compounded injection molding material comprising polyvinyl chloride and cellulosic fiber (Solca-Floc, 5% to 20% by weight) along with epoxidized soybean oil, hydrocarbon extenders, and stearic acid as a lubricant.

Another method of improving the dispersibility of cellulose fibers in a thermoplastic matrix is described in U.S. Pat. No. 4,414,267, according to which cellulose fibers (hardwood kraft, from 1% to 40% by weight of the final composite) are pretreated by slurrying them in water, contacting them with an aqueous suspension of a mixture of a vinyl chloride polymer and a plasticizer, and drying the thus-treated fibers. Yet another approach to improving cellulose filler dispersibility is described in U.S. Pat. No. 4,559,376, according to which cellulose or lignocellulose material is subjected to a hydrolytic pretreatment using diluted hydrochloric or sulfuric acid. Essentially, the treatment converts cellulose or lignocellulose material to a fine powder of microcrystalline cellulose, which exhibits better dispersibility in a polymer matrix such as high-density polyethylene (HDPE).

Attention in the fiber-plastic composite area has been increasingly paid to improving the physical properties, such as mechanical strength, stiffness, resistance to thermal deformation, etc., of the composite products. U.S. Pat. Nos. 4,687,793 and 4,783,493 describe elimination of moisture from cellulosic fiber (wood flour, rice hulls, waste paper, pulp, etc.) before blending them with a thermoplastic polymer (polypropylene, polyethylene, ABS, polyvinyl chloride, etc.), by heat-treating (80 to 150° C.) the cellulosic material with glyoxal (0.5% to 12% by weight of the untreated cellulose). The patentees indicate that this treatment produces a cellulosic filler largely free of moisture, results in molded products free of the cavities or blisters typically caused by moisture-generated steam at molding temperatures of 160° C. (320° F.) and higher, and improves the physical properties of molded products (containing 10% to 65% of this cellulose filler by weight). U.S. Pat. No. 4,833,011 describes an approach to reducing the water content of cellulose fibers (bleached chemical or thermomechanical pulp) prior to mixing them with the thermoplastic resin (particularly an unsaturated polyester resin, such as an epoxy resin, with a crosslinking accelerator). The disclosed drying method involves thermal treatment (heating the fibers) or the chemical treatment (treating the fibers with alcohols, such as ethanol, polyvinyl alcohol, butanol or heptanol). The mix is heated and pressed in a mold, causing its crosslinking and curing. U.S. Pat. No. 4,717,743 discloses polyolefin-based resin compositions comprising newspaper sheets cut to small pieces (3 to 6 mm in size, 20% to 60% by weight of total composite, with 20% to 40% by weight given in the examples) and thermoplastic polymer such as low-density or high-density polyethylene, polypropylene and the like. U.S. Pat. No. 4,737,532 describes a thermoplastic resin composition comprising polyvinyl chloride, an ABS resin, and a high amount of wood flour (up to 60% by weight, as given in the examples), pressed at 200° C. to obtain composite sheets.

Attention has also been paid to improving the compatibility of the filler with the polymer matrix, by providing an interaction between the filler and the polymer. "Compatibilizers" can be chemically attached either to cellulose fibers, or to a polymer, or can form a covalent chemical bond between the two, or can help to form a sort of uniform "alloy" between two or several polymeric components ordinarily not very compatible with each other. Generally, compatibilizers markedly improve physical properties of the polymeric composite, its weatherability, and overall performance. U.S. Pat. No. 4,376,144 discloses a thermoplastic composite in which cellulose fiber (hardwood pulp, from 1% to 40% by weight) is attached to the polyvinyl chloride matrix with an isocyanate bonding agent (a cyclic trimer of toluene diisocyanate). A similar approach that uses alkyl isocyanates to bind cellulose fibers (from 1% to 50% by weight of the composite) to thermoplastic polymers such as polyethylene is described in U.S. Pat. No. 4,791,020. In both cases the patentees suggest that cellulose fibers treated in such a way have improved dispersability into the polymer and improved adhesion thereto. As the '020 patent indicates, the precise mechanism by which the bonding occurs is not known, but the active isocyanate moieties in the bonding agent apparently react with the hydroxyl groups on the cellulose fibers, forming a chemical bonding with the latter. Another compatibilizer, a silylating agent, is described in U.S. Pat. Nos. 4,820,749 and 5,008,310, along with a series of isocyanate bonding agents, such as polymethylene polyphenylisocyanate, 1,6-hexamethylene di-isocyanate, and others. These patents disclose a reinforced composite material comprising a thermoplastic or thermosetting polymer, such as low density polyethylene, polypropylene or polystyrene, ground wood pulp (10% to 40% by weight), inorganic filler, such as clay, calcium carbonate, asbestos, glass fibers and the like (10%–30% with respect to wood pulp), maleic anhydride (0–5%) and gamma-aminopropyltriethoxysilane or similar silylating agents (0.1% to 8% by weight) or isocyanates (0.1% to 20% by weight). The patentees indicate that the silane or isocyanate grafting and bonding process results in better flowability of molten polyethylene and better physical properties of the finished composite product. U.S. Pat. No. 5,120,776 also discloses using of maleic anhydride (0–4%) to improve the bonding and dispersibility of an extruded mixture of 60%–90% of high-density polyethylene and 40% to 10% of wood flour (or chemithermomechanical pulp). U.S. Pat. No. 5,153,241 discloses composites made of thermoplastic polymers such as low density polyethylene, polypropylene or polystyrene (90% to 60%) and wood pulp or sawdust (10% to 40% by weight) grafted with a titanium coupling agent (isopropyltri[n-ethylaminoethylamino]titanate) in acetone, along with some inorganic fillers, such as calcium carbonate and Portland cement. U.S. Pat. No. 4,851,458 describes a composite material comprising polyvinyl chloride and cellulose filler (cellulose fiber or wood meal, preferably from 3% to 20% by weight of total) along with an "adhesion promoter" of undisclosed chemical structure or composition; the adhesion promoter is applied (coated or sprayed) to the fibers prior to incorporation thereof into the polymer. The patentees claim that the disclosed composite exhibits less shrinkage at elevated temperatures compared with polyvinyl chloride itself or filled with calcium carbonate; in particular, in a test at 110° C. for one hour, the patentees indicate that PVC exhibits shrinkage of 2% to 4% of the original length, while the disclosed PVC-cellulose composite shows shrinkage below 1% at the same conditions. U.S. Pat. No. 5,981,631 describes achieving compatibility of the ingredients in a thermoplastic composition by extruding a polymer (polyethylene, polypropylene or polyvinyl chloride), wood fibers, and a coupling agent containing fatty acids and rosin acids, both having at least 16 carbon atoms.

Numerous patents issued in the 1990s concern composite materials comprising polyethylene (high- or low-density, HDPE and LDPE, respectively) and cellulose fibers. U.S. Pat. Nos. 5,082,605, 5,088,910 and 5,096,046 disclose a composite made of 40% to 60% of plastic (LDPE, or a combination of 60% LDPE and 40% HDPE, or having 10–15% of polypropylene of the total amount of plastic) and about 60% to 40% of wood fiber. U.S. Pat. No. 5,474,722 describes a composite material 20% to 80% of which a cellulosic material (ground wood, sawdust, wood flour, rice hulls, etc.) and polyethylene. U.S. Pat. No. 5,480,602 discloses a composite comprising polypropylene, polyethylene, or their combination along with lignocellulosic particles (50% to 70% by weight) and a polyurethane coupling agent (15 to 3% by weight of the mixture). U.S. Pat. No. 5,516,472 discloses a composite having approximately 26% HDPE and 65% wood flour, extruded in the presence of zinc stearate (2%) as a lubricant along with phenolic resin and polyurethane as minor additives and cross-linking agents (4% and 1.3%, respectively). U.S. Pat. Nos. 5,827,462, 5,866,264, 6,011,091 and 6,117,924 describe extruded thermoplastic composites comprising 20% to 40% HDPE or polyvinyl chloride, and 50% to 70% of wood flour, along with 0.5%–2% of lubricants (zinc stearate or calcium stearate) and other minor additives. The foregoing four patents contain an example of the composite (Recipe A and B) showing HDPE and PVC at 26% by weight, wood flour at 66%, and the above-indicated amount of lubricants and other minor additives. U.S. Pat. No. 5,863,480 discloses a thermoplastic composite of polyethylene, polypropylene, vinyls or other extrudable plastics, cellulosic fiber such as saw dust, wood flour, ground rice hulls, etc., fillers and lubricants. The patentees describe the extrusion occurring through a die at a temperature below the melting point of the polymer, so that the deformation of the polymer takes place in the solid phase, making the product biaxially oriented. Canadian Patent No. 2,278,688 discloses a thermoplastic composite material 50% to 60% of which is polyethylene or polypropylene, 10% to 30% of which is wood powder, and 10% to 35% of which is a silicate (mica). U.S. Pat. No. 5,952,105 describes a thermoplastic composition comprising sheared poly-coated paper (50% to 70% by weight) and polyethylene (30% to 50%). An example provided in the patent describes making an 80 g batch of a compression molded composite comprising HDPE (39%), a poly-coated paper (scrap milk jugs, 59%) and a coupling agent (Polybond 3009, 2%). U.S. Pat. No. 5,973,035 by the same authors describes a similar thermoplastic composition comprising sheared paper (50% to 70% by weight) and polyethylene (30% to 50%). An example provided in this patent describes production of an 80 g batch of a compression-molded composite comprising HDPE (39%), sheared scrap newspapers or magazines (59%), and a coupling agent (Fusabond 100D, 2%). U.S. Pat. No. 6,207,729 describes a similar thermoplastic composition comprising shredded and sheared cellulosic materials (33%–59% by weight) such as old newspapers, magazines, kenaf, kraftboard, etc., HDPE (33% to 50%), calcium carbonate (11% to 17%), and a coupling agent (Fusabond 100D, 2%). U.S. Pat. No. 6,153,293 discloses a thermoplastic composite comprising wood fiber (40%–60% by weight) and polyethylene (60%–40%) along with a powdered endothermic foaming agent. The patentees suggest that the foaming agent causes a greater degree of expansion of the composite, conferring a lower specific gravity ($1.0\pm0.2$ g/cm$^3$) with no significant loss of overall strength (modulus of rupture of 1,676 psi).

Recently attention has again been paid to alternative thermoplastic materials (e.g., other than polyethylene). U.S. Pat. No. 5,288,772 discloses a cellulose fiber-reinforced thermoplastic composition for compression molding, where thermoplastic material is polypropylene, or a mixture of polypropylene, polystyrene and polyethylene (40% to 90% of plastic by weight), and the cellulosic material (10% to 60% by weight) was milled scrap newspaper with an initial moisture content of at least 30% by weight. The patentees suggest that lignin present in the cellulosic scrap provides a coherent mass of thermoplastic and cellulosic material. A biodegradable thermoplastic composition comprising polyvinyl alcohols, polyurethanes or polyacrylates, cellulose fibers and chitosan is disclosed in U.S. Pat. No. 5,306,550. Canadian Patent Nos. 2,100,320, 2,178,036, 2,242,326, and U.S. Pat. Nos. 5,486,553, 5,539,027, 5,585,155, 5,827,607, 5,948,524, 6,015,611 and 6,015,612 describe a composite material comprising a polyvinyl chloride polymer (50% to 70%) and wood fiber (sawdust, 30% to 50%). Canadian Patent No. 2,250,161 and U.S. Pat. No. 5,738,935 disclose a thermoplastic composite comprising polyvinyl chloride (45% to 90%), cellulose fiber (10% to 55%), a porosity aid (0.01% to 5%) and an interfacial agent (0.01% to 2%). U.S. Pat. Nos. 5,635,125 and 5,992,116 describe a molded composite of wood sawdust particles (34% to 44%) and ground-up recycled polyvinyl chloride particles (55% to 65%). U.S. Pat. No. 5,783,505 discloses a biodegradable composition involving a blend of cellulose acetate and cotton for the manufacture of a non-woven products such as diapers. Biodegradable thermoplastic composite, comprising aliphatic polyester urethanes or polyester amides and wood flour as a reinforcing material, are described in U.S. Pat. No. 5,827,905.

Another recent innovation involves compounding of thermoplastic polymers and cellulosic materials along with other ingredients into a feedstock in the form of durable, easy to transport, and non-friable pellets. U.S. Pat. Nos. 5,746,958 and 5,851,469 disclose production of a wood-thermoplastic composite material comprising a wood component (40% to 65% by weight, and preferably 52%) and polyethylene (60% to 35%), preferably HDPE and preferably 48% by weight. U.S. Pat. No. 5,938,994 describes a wood-plastic composite material produced as feedstock pellets in a twin screw extruder, and comprising wood flour (about 20% to 80%) and polyethylene (80% to 20%) as a preferred plastic. U.S. Pat. Nos. 5,948,524, 6,015,612 and 6,210,792 disclose a wood-plastic composition manufactured as feedstock pellets comprising polyvinyl chloride and wood fiber.

Accordingly, although the prior art includes various thermoplastic composites based on waste materials, few of these materials are readily available on a widespread and cost-effective basis. Moreover, their proportion in the overall composite mixture tends to be somewhat low, since high proportions of non-plastic components can compromise mechanical properties. As a result, the environmental benefits offered by these compositions is limited.

DESCRIPTION OF THE INVENTION

BRIEF SUMMARY OF THE INVENTION

We have found that high levels of granulated papermaking sludge (e.g., up to 70%–75%) can be mixed with plastic and, if desired, cellulose fiber to form composite materials that may be shaped into structural and non-structural articles. Surprisingly, despite relatively low levels of plastic (e.g., 20% to 40%), these composites exhibit worthwhile mechanical properties (having high strength, high modulus, high impact resistance, and good resistance to decay), can be made non-flammable, and show other useful properties making them economically attractive and beneficial to the environment.

In one aspect, the present invention relates to a composite formulation useful as a feedstock in the manufacture of composite end products, such as structural and non-structural construction materials, roofing tiles, fences, door panels, sound barriers, decking materials, decorative wall coverings and the like. In a representative embodiment, the feedstock composite contains granulated papermaking sludge and plastic. The feedstock may also contain cellulose fiber (e.g., agricultural by-products in a short-fiber form, such as rice hulls, cotton linters, ground cotton and other plant fibrous materials, fibers from textile manufacturing, pulping and paper converting operations, recycling of paper and wood products, etc.), and, if desired, additives such as reinforcing agents, lubricants, colorants, compatibilizers, and/or flame retardants. An advantage of the invention is the ecological benefit of utilizing papermaking sludge that would otherwise be disposed of as industrial waste; indeed, further ecological benefit can be realized by combining the granulated sludge with recycled plastic in formulating the composite.

The environmental benefits of productively utilizing papermaking sludge and avoiding its disposal are considerable. Pulp and paper sludge (a byproduct of primary pulping operations, recycle streams or waste paper pulping and the like) represents an environmental and disposal problem for manufacturers of pulp and paper. Generally, pulp and paper sludge is unsuitable for paper making, although it generally contains the same components—cellulose, lignin, hemicellulose, calcium carbonate, clay, and other inorganic components—as those present in the paper pulp itself.

Paper sludge has traditionally been disposed of by landfilling, composting, incorporation into cement, and incineration. The latter option, in turn, creates another problem, namely, disposal of the resulting ash, which often makes up to 50% (and sometimes as much as 80% or higher) of the volume of the sludge itself.

The principal components of ash are calcium carbonate—in the form of precipitated calcium carbonate (PCC) or ground calcium carbonate (GCC)—that typically constitutes 20% and up to 75% of dry sludge content, and clay. These two minerals are typically loaded into paper as a coating and filler to improve the mechanical characteristics as well as the appearance of paper. The resulting papermaking sludge, particularly mixed office paper sludge, consists primarily of two major components, i.e., fiber and minerals finely mixed with each other.

A typical recycling mill processes 600 tons of wastepaper per day, yielding 450 tons of pulp and producing 150 tons of papermaking sludge. The 228 mills currently under operation in North America produce 9 million tons of pulp residue, approximately 5 million tons of which is cellulose. The 154 European pulp and paper mills produce about 8 million tons of pulp residue, approximately 4 million tons of which is cellulose. The conversion of such waste material into value-added products has, therefore, long been desired.

GranTek Inc. (Green Bay, Wis.) manufactures controlled size dust-free granules, made of pulp and paper sludge, under the brand name BIODAC. The granules are a tight composite of organic and inorganic materials, i.e., cellulose fiber and minerals, and possess a developed porous structure. This granulated papermaking sludge is described, for example, in U.S. Pat. No. 5,730,371, the entire disclosure of which is hereby incorporated by reference. The granules have a controlled size and possess a developed porous structure; they are composed of organic and inorganic materials, i.e., cellulose fiber and minerals. It has been found that granulated pulp and paper sludge absorbs oil or other hydrophobic fluids to a high extent; for example, the particles described in the '371 patent can absorb more than their own weight.

It is also found that granulated pulp and paper sludge, compared with loose cellulose fiber, greatly improves the properties of fiber-plastic composites. Moreover, while reinforcement of polymer matrices by incorporation of cellulose fiber is well-known, the incorporation of cellulose fiber into polymer hot melt is difficult. Intensive prolonged mixing is ordinarily required to disperse the fiber. It is particularly difficult to obtain high-strength fiber-plastic composites, since fibers typically possess a high degree of fiber-fiber interaction, tending to stick together in bundles of fibers and resisting dispersion of the individual fibers. It has been found, however, that granulation of pulp and paper sludge, approximately half of which is typically cellulose fiber, reduces fiber-to-fiber interaction prior to incorporating it into the matrix, and improves the mechanical properties of the composite.

DETAILED DESCRIPTION OF THE PREFERRED EMBODIMENTS

The composites of the present invention preferably utilize granulated pulp and paper sludge. A preferred material is the BIODAC product described above. Since BIODAC granules have a very developed porous infrastructure, and are able to absorb a high amount of liquid, both hydrophilic and hydrophobic, such as oil (generally more than 100% by weight), they may be employed as a major ingredient in thermoplastic composites. In the preferred embodiment, organic material comprises a majority of the composition by weight, and desirably represents at least 60% (ideally 70–75%) by weight of the composition. The organic material preferably comprises granulated sludge, alone or in combination with cellulose fibers (e.g., rice hulls); the latter may be added to reduce overall material costs, but is by no means necessary to the invention. The composition also includes a polymer composition comprising a synthetic polymer resin, either alone or in the form of a plastic (i.e., combined with additives such as colorants, plasticizers, etc.) such as virgin and/or recycled HDPE, or LDPE, LLDPE, polypropylene, polyvinyl chloride, nylon 6, nylon 66 or other suitable material, at levels preferably ranging from 20–40% by weight. If desired, the composition may include additives such as reinforcing agents, lubricants, colorants, compatibilizers, and/or flame retardants at levels consistent with well-known applications of these components in conventional thermoplastic compositions. The final product is desirably extrudable, injection moldable and/or compression moldable.

The following examples illustrate various compositions that were formulated and then used to manufacture specified end products. The listed components were blended on a weight basis to form a homogeneous mix, then fed to a twin-screw compounding extruder. The resulting compounded material was pelletized, and fed to a single-screw extruder to form the end product.

The end products were tested according to ASTM D6109 (load at failure, flexural strength, flexural modulus), D6108 (load at failure, compressive strength), modified D3763 (puncture resistance), E1 (termite resistance), D1929 (self-ignition), D1037 (specific gravity, water absorption, moisture content), D635 (rate of burning).

EXAMPLE 1

A composition containing BIODAC granular material (20-50 mesh) was compounded and pelletized using a twin-screw extruder, and then extruded into an end product, a Decking 1.25"×5.5" Hollow Two-Vane Board, 0.25" wall thick. Before testing as described below, the board was brushed.

The composition was as follows, with percentages by weight:

| | |
|---|---|
| HDPE: | 36% |
| BIODAC: | 29% |
| Rice hulls (ground): | 32% |
| Other: | 3% |
| (Other materials may include, e.g., rubber, such as any suitable elastomer; lubricants, such as light paraffinic mineral oil "100-P Oil", Epolene G-3015, Epolene 3003, Epolene E-20, Struktol TR, Struktol 016, Structol 060, Agawax 280, Lubristab, zinc stearate, calcium stearate, etc.; UV stabilizers, such as Tinuvin 111, Tinuvin 783, Tinuvin 791, Irganox B 1411, Irganox B 900, Irganox B 225, Irganox B 561, etc.; antimicrobial agents, such as borates, etc.) | |
| Load at Failure (20" span, 3-pt. load): | 578 ± 12 lbs |
| Flexural strength: | 2,450 ± 50 psi |
| Flexural modulus of elasticity: | 371,000 ± 43,000 psi |
| Compressive Load at Failure (2.5" high): | 11,970 ± 1,020 lbs |
| Compressive Strength: | 3,500 ± 300 psi |
| Termite Resistance (weight loss) for four weeks: | 0.24% |
| Self-ignition: | 775° F. (413° C.) |
| Specific Gravity: | 1.19 g/cm$^3$ |
| Water Absorption: | 1.8% (compare to 20.8% for pressure-treated lumber) |
| Moisture Content: | 0.39% (compare to 13.8% in pressure-treated lumber at the same conditions) |

COMPARATIVE EXAMPLE 2

The procedure of Example 1 was repeated, but without BIODAC as part of the composition. The deficit was filled primarily by an additional amount of rice hulls, i.e., cellulosic fiber. The extruded profile of the end product was the same as that in Example 1, and brushed in the same manner.

| | |
|---|---|
| HDPE: | 39% |
| Rice hulls (ground): | 57% |
| Other: | 4% |
| (Rubber, lubricants, UV stabilizers, antimicrobial agents) | |
| Load at Failure (20" span, 3-pt. load): | 498 ± 38 lbs |
| Flexural strength: | 2,110 ± 160 psi |
| Flexural modulus of elasticity: | 276,000 ± 7,000 psi |
| Compressive Load at Failure (2.5" high): | 10,250 ± 1,060 lbs |
| Compressive Strength: | 3,000 ± 300 psi |
| Termite Resistance (weight loss) for four weeks: | 0.41% |
| Self-ignition: | 725° F. (385° C.) |
| Specific Gravity: | 1.10 g/cm$^3$ |
| Water Absorption: | 3.0% |
| Moisture Content: | 0.64% |

EXAMPLE 3

The procedure of Example 1 was repeated, but with the difference that a Decking 1.25"×5.5" Hollow Tongue & Groove Board, 0.25" wall thickness, was extruded.

| | |
|---|---|
| Load at Failure (20" span, 3-pt. load): | 481 ± 20 lbs |
| Flexural strength: | 2,220 ± 90 psi |
| Flexural modulus of elasticity: | 373,000 ± 45,000 psi |
| Compressive Load at Failure (2.5" high): | 12,100 ± 200 lbs |
| Compressive Strength: | 3,450 ± 70 psi |
| Puncture Resistance | 464 ± 15 lbs |

COMPARATIVE EXAMPLE 4

The procedure of Comparative Example 2 was repeated (in the absence of BIODAC), but with a difference that a profile, described in Example 3, was extruded.

| | |
|---|---|
| Load at Failure (20" span, 3-pt. load): | 418 ± 48 lbs |
| Flexural strength: | 1,930 ± 220 psi |
| Flexural modulus of elasticity: | 226,000 ± 25,000 psi |
| Compressive Load at Failure (2.5" high): | 9,900 ± 540 lbs |
| Compressive Strength: | 2,800 ± 150 psi |
| Puncture Resistance | 314 ± 23 lbs |

EXAMPLE 5

The procedure of Example 1 was repeated, but with the difference that a hollow 4"×4" Post, 0.25" wall thick, was extruded.

| | |
|---|---|
| Load at Failure (52" span, 4-pt. load): | 929 ± 26 lbs |
| Flexural strength: | 1,824 ± 51 psi |
| Flexural modulus of elasticity: | 328,000 ± 17,000 psi |
| Compressive Load at Failure (8" high): | 10,530 ± 380 lbs |
| Compressive Strength: | 2,800 ± 100 psi |

COMPARATIVE EXAMPLE 6

The procedure of Comparative Example 2 was repeated (in the absence of BIODAC), but with the difference that a profile as described in Example 5 was extruded.

| | |
|---|---|
| Load at Failure (52" span, 4-pt. load): | 866 ± 16 lbs |
| Flexural strength: | 1,7004 ± 30 psi |
| Flexural modulus of elasticity: | 302,000 ± 20,000 psi |
| Compressive Load at Failure (8" high): | 9,800 ± 1,400 lbs |
| Compressive Strength: | 2,600 ± 400 psi |

EXAMPLES 7 Through 9

These examples describe BIODAC-containing composites, extruded as hollow 1.75"×1.75" pickets, with BIODAC present in amounts ranging from 29% to 70%.

| EXAMPLE No. | Composition | Flexural Strength |
|---|---|---|
| 7 | HDPE: 36%<br>BIODAC: 29%<br>Rice hulls: 32%<br>Other: 4% | 1,741 ± 91 psi |
| 8 | HDPE: 37%<br>BIODAC: 62%<br>Other: 1% | 1,870 ± 60 psi |
| 9 | HDPE: 22%<br>BIODAC: 70%<br>Rice hulls: 5%<br>Other: 3% | 1,943 ± 157 psi |

These examples suggest, first, that the amount of BIODAC can vary widely without impairing the strength of the end product, and second, that in the presence of BIODAC the amount of plastic can be decreased at least to 22% without impairing strength of the end product.

EXAMPLE 10

This example compares flammability (in terms of rate of burning) of the BIODAC-containing composite of Example 9 above with a commercial (TREX) material manufactured by mixing and extruding wood fibers with polyethylene, using an approximate 50–50 mixture (*BOCA Research Report* 98–28). The flammability tests were conducted by VTEC Laboratories Inc. (New York). The specimens bar size in both cases was 125 mm×13 mm×8 mm.

| Material | Burning rate (mm/min) |
| --- | --- |
| Material of Example 9 (70% of BIODAC) | 7.6 |
| TREX | 18.2 |

It is apparent from the above, when Examples 1 and 2, 3 and 4, and 5 and 6 are respectively compared in pairs, that granulated papermaking sludge added into a composite mixture increases flexural strength and flexural modulus of elasticity, compressive strength, puncture resistance, termite resistance. Moreover, these mixtures exhibit lower moisture content, water absorption, and burning rate. The invention therefore provides, on one hand, new and effective composite materials, and on the other, a new use for pulp and paper sludge that heretofore has primarily been burned or landfilled. It will be clear from the present disclosure that the new composite materials, containing granulated papermaking sludge along with plastic, in general may be utilized for a wide variety of specific applications.

Although this invention has been described in its preferred form and preferred practice with a certain degree of particularity, it is understood that the present disclosure of the preferred form and preferred practice has been made only by way of example and that numerous changes may be resorted to without departing from the spirit and the scope of the invention as hereinafter claimed.

What is claimed is:

1. A method of making a composite material, the method comprising the step of combining papermaking sludge in granulated form comprising a composite of organic and inorganic materials and having a porous structure with a polymer composition comprising a synthetic polymer resin.

2. The method of claim 1 wherein the sludge comprises at least 5% by weight of the mixture.

3. The method of claim 1 wherein the sludge comprises at least 20% by weight of the mixture.

4. The method of claim 1 wherein the sludge comprises at least 50% by weight of the mixture.

5. The method of claim 1 wherein the sludge comprises at least 70% by weight of the mixture.

6. The method of claim 1 wherein the polymer composition is a plastic.

7. The method of claim 6 wherein the plastic comprises at least one of high-density polyethylene, low-density polyethylene, polypropylene, polyvinyl chloride, and nylon.

8. The method of claim 1 wherein the combining step further comprises adding cellulose fibers to the sludge and polymer composition.

9. The method of claim 8 wherein the cellulose fibers are in the form of rice hulls.

10. The method of claim 1 further comprising the step of extruding, injection molding, or compression molding the mixture.

11. A composite material comprising a mixture of:
   a. papermaking sludge in granulated form comprising a composite of organic and inorganic materials and having a porous structure; and
   b. a polymer composition comprising a synthetic polymer resin.

12. The material of claim 11 wherein the sludge comprises at least 5% by weight of the mixture.

13. The material of claim 11 wherein the sludge comprises at least 20% by weight of the mixture.

14. The material of claim 11 wherein the sludge comprises at least 50% by weight of the mixture.

15. The material of claim 11 wherein the sludge comprises at least 70% by weight of the mixture.

16. The material of claim 11 wherein the polymer composition is a plastic.

17. The material of claim 16 wherein the plastic comprises at least one of high-density polyethylene, low-density polyethylene, polypropylene, polyvinyl chloride, and nylon.

18. The material of claim 11 wherein the mixture is amenable to processing by at least one of extrusion, injection molding, and compression molding.

19. The material of claim 11 further comprising cellulose fibers.

20. The material of claim 19 wherein the cellulose fibers are in the form of rice hulls.

* * * * *